United States Patent
Tomita et al.

(10) Patent No.: US 12,469,846 B2
(45) Date of Patent: Nov. 11, 2025

(54) NONAQUEOUS ELECTROLYTE SECONDARY BATTERY AND MANUFACTURING METHOD THEREOF

(71) Applicant: PRIME PLANET ENERGY & SOLUTIONS, INC., Tokyo (JP)

(72) Inventors: Masataka Tomita, Okazaki (JP); Hiroyuki Yamaguchi, Toyota (JP); Yoshinari Makimura, Nissin (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 800 days.

(21) Appl. No.: 17/688,110

(22) Filed: Mar. 7, 2022

(65) Prior Publication Data

US 2022/0293928 A1    Sep. 15, 2022

(30) Foreign Application Priority Data

Mar. 15, 2021   (JP) ................. 2021-041391

(51) Int. Cl.
*H01M 4/505*   (2010.01)
*H01M 4/02*    (2006.01)
(Continued)

(52) U.S. Cl.
CPC ......... *H01M 4/505* (2013.01); *H01M 4/0435* (2013.01); *H01M 4/5825* (2013.01); *H01M 2004/028* (2013.01)

(58) Field of Classification Search
CPC .. H01M 4/505; H01M 4/0435; H01M 4/5825; H01M 2004/028; H01M 4/366
See application file for complete search history.

(56) References Cited

U.S. PATENT DOCUMENTS

| | | | |
|---|---|---|---|
| 2016/0043395 A1* | 2/2016 | Kawakami | H01M 4/62 429/223 |
| 2016/0087315 A1* | 3/2016 | Oyama | H01M 10/049 429/61 |

(Continued)

FOREIGN PATENT DOCUMENTS

| | | | |
|---|---|---|---|
| CN | 103035906 A | * | 4/2013 |
| CN | 106068573 A | | 11/2016 |

(Continued)

OTHER PUBLICATIONS

Chong, Jin et al., Chem Pub Soc. Europe. "$Li_3PO_4$-Coated $LiNi_{0.5}Mn_{1.5}O_4$: A Stable High-Voltage Cathode Material for Lithium-Ion Batteries," pp. 7479-7485, Apr. 29, 2014.

(Continued)

*Primary Examiner* — Ula C Ruddock
*Assistant Examiner* — Sydney L Kline
(74) *Attorney, Agent, or Firm* — Finnegan, Henderson, Farabow, Garrett and Dunner, LLP

(57) ABSTRACT

A nonaqueous electrolyte secondary battery is provided which is suppressed in capacity deterioration upon repeating charging and discharging irrespective of cracks being formed in a lithium manganese oxide particle having a spinel type crystal structure. The nonaqueous electrolyte secondary battery herein disclosed includes a positive electrode, a negative electrode, and a nonaqueous electrolyte. The positive electrode includes a positive electrode active material layer. The positive electrode active material layer includes lithium manganese oxide particles having a spinel type crystal structure as the positive electrode active material. At least a part of the lithium manganese oxide particles has a cracked part. The lithium manganese oxide particles have a coating film on the particle surface including the surface of the cracked part. The coating film contains a P (Continued)

component including a LiMnPO$_4$ component, and a F component.

9 Claims, 3 Drawing Sheets

(51) Int. Cl.
*H01M 4/04* (2006.01)
*H01M 4/36* (2006.01)
*H01M 4/58* (2010.01)

(56) References Cited

U.S. PATENT DOCUMENTS

| | | | |
|---|---|---|---|
| 2016/0204426 A1* | 7/2016 | Miura | H01M 4/131 |
| | | | 429/199 |
| 2017/0077502 A1* | 3/2017 | Kishimoto | H01M 4/366 |
| 2017/0125840 A1* | 5/2017 | Akiyama | H01M 10/4235 |
| 2017/0250396 A1 | 8/2017 | Hiratsuka | |
| 2018/0102540 A1 | 4/2018 | Shindo et al. | |

FOREIGN PATENT DOCUMENTS

| | | |
|---|---|---|
| CN | 106654168 A | 5/2017 |
| CN | 107134564 A | 9/2017 |
| JP | 09-259863 A | 10/1997 |
| JP | 2014-103098 A | 6/2014 |
| JP | 2014-130774 A | 7/2014 |
| JP | 2016-115654 A | 6/2016 |
| JP | 2018-060751 A | 4/2018 |
| WO | WO 2014/064513 A1 | 5/2014 |

OTHER PUBLICATIONS

Fang, Shuyu et al., "Anode-originated SEI migration contributes to formation of cathode-electrolyte interphase layer," Journal of Power Sources, 373, pp. 184-192, Nov. 10, 2017.
Second Office Action issued in Chinese patent application CN202210252536.7, dated Aug. 23, 2025.
Lou et al., "Layered Lithium-Rich Positive Electrode Materials for Lithium-Ion Batteries," Beijing Technology University Press, dated Apr. 30, 2020, pp. 056-060.

* cited by examiner

NONAQUEOUS ELECTROLYTE SECONDARY BATTERY AND MANUFACTURING METHOD THEREOF

BACKGROUND OF THE INVENTION

1. Field of the Invention

The present disclosure relates to a nonaqueous electrolyte secondary battery. The present disclosure also relates to a method for manufacturing the nonaqueous electrolyte secondary battery. The present application claims priority based on Japanese Patent Application No. 2021-041391 filed on Mar. 15, 2021, the entire contents of which are incorporated by reference in the present specification.

2. Description of the Related Art

In recent years, a nonaqueous electrolyte secondary battery such as a lithium ion secondary battery is desirably used for a portable power supply for a personal computer, a portable terminal, or the like; power supply for driving a vehicle such as a battery electric vehicle (BEV), a hybrid electric vehicle (HEV), or a plug-in hybrid electric vehicle (PHEV); or the like.

For a nonaqueous electrolyte secondary battery, generally, an active material capable of occluding and releasing ions serving as electric charge carriers. As the active material for use in the positive electrode, lithium manganese oxide ($LiMn_2O_4$) having a spinel type crystal structure is known. The lithium manganese oxide of this crystal structure has the following disadvantage: when a nonaqueous electrolyte secondary battery is subjected to charging and discharging repeatedly, manganese (Mn) dissolves into the electrolyte, so that the capacity tends to be deteriorated. There is known a technology of providing a film including phosphorus in a lithium manganese oxide particle in order to suppress the capacity deterioration due to the dissolution of Mn (see, e.g., Japanese Patent Application Publication No. H09-259863).

SUMMARY OF THE INVENTION

A nonaqueous electrolyte secondary battery has been required to be further enhanced in performances with spread thereof. As one of the measures for enhancing the performances of a nonaqueous electrolyte secondary battery, the method is known in which a positive electrode active material layer including a positive electrode active material is subjected to a press treatment, thereby increasing the density of the positive electrode active material layer, resulting in an increase in energy density. However, the present inventors conducted a close study thereon, and as a result, they found the following: when the positive electrode active material layer is further increased in density by a press treatment in order to more enhance the energy density, cracking is caused in a lithium manganese oxide particle, so that dissolution of Mn is caused from the cracked part, undesirably resulting in deterioration of the capacity.

Under such circumstances, it is an object of the present disclosure to provide a nonaqueous electrolyte secondary battery suppressed in capacity deterioration upon repeating charging and discharging irrespective of the formation of cracks in a lithium manganese oxide particle having a spinel type crystal structure.

The present inventors conducted a close study thereon, and as a result, they found the following: in manufacturing a nonaqueous electrolyte secondary battery, a positive electrode active material layer is allowed to include lithium phosphate, which is subjected to coating formation at a much higher voltage than the operating voltage of the nonaqueous electrolyte secondary battery; in this case, a coating film capable of suppressing dissolution of Mn can be formed on the whole particle including the cracked part of the lithium manganese oxide particle having a spinel type crystal structure. Further, the present inventors analyzed the coating film, and found that the coating film included a specific component (i.e., a $LiMnPO_4$ component), leading to the completion of the present disclosure.

Namely, the nonaqueous electrolyte secondary battery herein disclosed includes a positive electrode, a negative electrode, and a nonaqueous electrolyte. The positive electrode includes a positive electrode active material layer. The positive electrode active material layer includes lithium manganese oxide particles having a spinel type crystal structure as a positive electrode active material. At least a part of the lithium manganese oxide particles has a cracked part. The lithium manganese oxide particles have a coating film on the particle surface including the surface of the cracked part. The coating film contains a P component including a $LiMnPO_4$ component, and an F component. With such a configuration, a nonaqueous electrolyte secondary battery can be provided which is suppressed in capacity deterioration upon repeating charging and discharging irrespective of cracks being formed in the lithium manganese oxide particle having a spinel type crystal structure.

In accordance with one desirable aspect of the nonaqueous electrolyte secondary battery herein disclosed, the ratio P/F of a P concentration expressed in terms of atom % relative to an F concentration expressed in terms of atom % in the coating film is 0.030 or more. In this case, the capacity deterioration suppressing effect is more enhanced.

In accordance with another desirable aspect of the nonaqueous electrolyte secondary battery herein disclosed, the density of the positive electrode active material layer is 2.6 $g/cm^3$ or more. In this case, the capacity deterioration suppressing effect is particularly enhanced.

In accordance with a still other desirable aspect of the nonaqueous electrolyte secondary battery herein disclosed, the positive electrode active material layer includes lithium phosphate. This configuration is advantageous for formation of the coating film containing a P component including a $LiMnPO_4$ component, and an F component.

In accordance with a yet another desirable aspect of the nonaqueous electrolyte secondary battery herein disclosed, the nonaqueous electrolyte includes $LiPF_6$ as an electrolyte salt. This is advantageous for formation of the coating film containing a P component including a $LiMnPO_4$ component, and an F component.

From another aspect, a method for manufacturing a nonaqueous electrolyte secondary battery herein disclosed includes the steps of: preparing a positive electrode sheet including a positive electrode active material layer containing lithium manganese oxide particles as positive electrode active materials and lithium phosphate particles; subjecting the prepared positive electrode sheet to a press treatment; preparing a battery assembly including a positive electrode sheet, a negative electrode sheet, and a nonaqueous electrolyte using the positive electrode sheet subjected to the press treatment; and subjecting the battery assembly to an initial charging treatment to form a coating film. In the step of performing the press treatment, cracks are formed in the lithium manganese oxide particles. In the step of forming a coating film, a coating film containing a P component including a $LiMnPO_4$ component, and an F component is formed on a particle surface including a surface of a cracked part of the lithium manganese oxide particles. With such a configuration, it is possible to manufacture a nonaqueous electrolyte secondary battery suppressed in capacity deterioration upon repeating charging and discharging irrespective of cracks being formed in a lithium manganese oxide particle having a spinel type crystal structure.

In accordance with one desirable aspect of the method for manufacturing a nonaqueous electrolyte secondary battery herein disclosed, the initial charging treatment is performed until the voltage becomes 4.7 V or more. This is advantageous for formation of the coating film including a $LiMnPO_4$ component, and an F component.

In accordance with another desirable aspect of the method for manufacturing a nonaqueous electrolyte secondary battery herein disclosed, the press treatment is performed such that the density of the positive electrode active material layer becomes 2.6 $g/cm^3$ or more. In this case, a particularly high capacity deterioration suppressing effect can be obtained.

DESCRIPTION OF THE PREFERRED EMBODIMENTS

Figure 1:
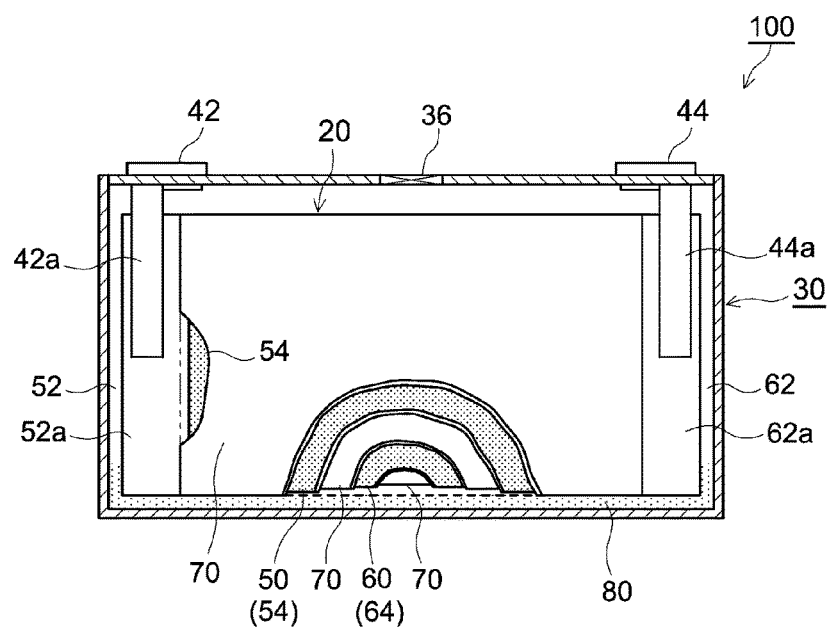
FIG. 1 is a cross sectional view schematically showing the internal structure of a lithium ion secondary battery in accordance with one embodiment of the present disclosure.

Below, referring to the accompanying drawings, embodiments in accordance with the present disclosure will be described. It should be noted that matters necessary for executing the present disclosure, except for matters specifically referred to in the present specification can be grasped as design matters of those skilled in the art based on the related art in the present field. The present disclosure can be executed based on the contents disclosed in the present specification, and the technical common sense in the present field. Further, in the following drawings, the members/parts producing the same function are given the same reference numeral and sign for description. Further, the dimensional relation (such as length, width, or thickness) in each drawing does not reflect the actual dimensional relation.

It should be noted that in the present specification, the term "secondary battery" represents an electric storage device capable of repeatedly charging and discharging, and is a term including a so-called storage battery and an electric storage element such as an electric double layer capacitor. Further, in the present specification, the term "lithium ion secondary battery" represents a secondary battery using lithium ions as electric charge carriers, and implementing charging and discharging due to transfer of electric charges accompanying lithium ions between positive and negative electrodes.

Below, by taking a flat square lithium ion secondary battery having a flat-shaped wound electrode body and a flat-shaped battery case as an example, the present disclosure will be described in details. However, it is not intended that the present disclosure is limited to such embodiments.

A lithium ion secondary battery 100 shown in FIG. 1 is a closed type battery constructed by accommodating a wound electrode body 20 in a flat shape and a nonaqueous electrolyte 80 in a flat square battery case (i.e., an exterior container) 30. The battery case 30 is provided with a positive electrode terminal 42 and a negative electrode terminal 44 for external connection, and a thin-walled safety valve 36 set for releasing the internal pressure when the internal pressure of the battery case 30 increases to a prescribed level, or higher. Further, the battery case 30 is provided with an injection port (not shown) for injecting the nonaqueous electrolyte 80. The positive electrode terminal 42 is electrically connected with a positive electrode collector plate 42a. The negative electrode terminal 44 is electrically connected with a negative electrode collector plate 44a. As the material for the battery case 30, for example, a metal material which is lightweight and has good thermal conductivity such as aluminum is used. It should be noted that FIG. 1 does not show the amount of the nonaqueous electrolyte 80 with precision.

Figure 2:
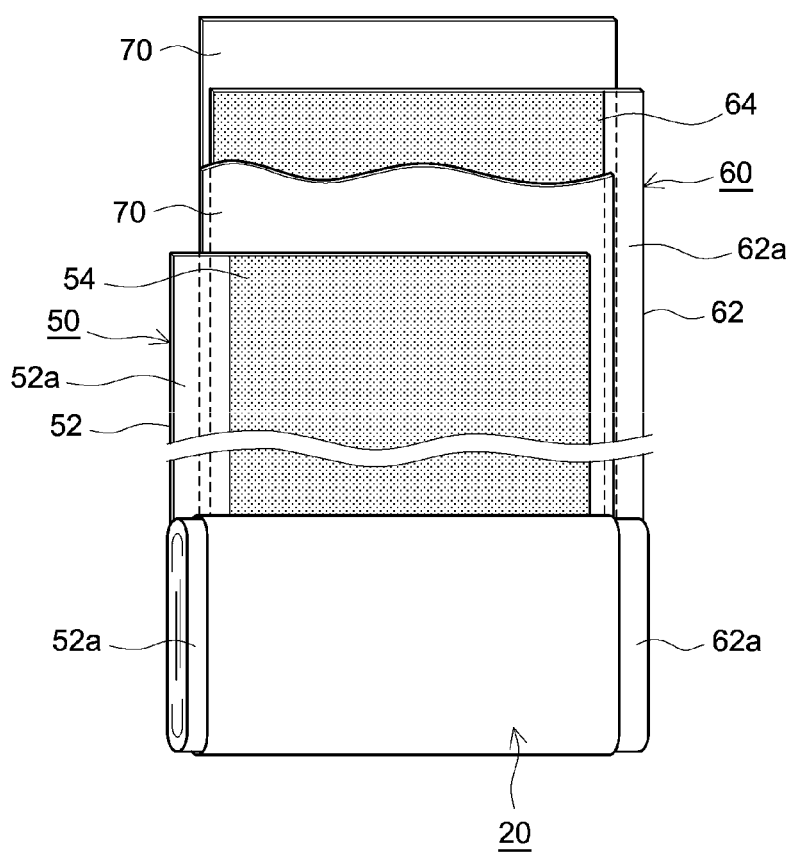
FIG. 2 is a schematic exploded view showing a configuration of a wound electrode body of a lithium ion secondary battery in accordance with one embodiment of the present disclosure.

The wound electrode body 20 has a form in which a positive electrode sheet 50 and a negative electrode sheet 60 are stacked one on another via two long separators 70, and are wound in the longitudinal direction as shown in FIGS. 1 and 2. The positive electrode sheet 50 has a configuration in which a positive electrode active material layer 54 is formed along the longitudinal direction on one surface or both surfaces (herein, both surfaces) of a long positive electrode collector 52. The negative electrode sheet 60 has a configuration in which a negative electrode active material layer 64 is formed along the longitudinal direction on one surface or both surfaces (herein, both surfaces) of a long negative electrode collector 62. A positive electrode active material layer non-formation part 52a (i.e., the part at which the positive electrode active material layer 54 is not formed, and the positive electrode collector 52 is exposed) and a negative electrode active material layer non-formation part 62a (i.e., the part at which the negative electrode active material layer 64 is not formed, and the negative electrode collector 62 is exposed) are formed so as to protrude from the opposite ends in the winding axis direction of the wound electrode body 20 (i.e., the sheet width direction orthogonal to the longitudinal direction). The positive electrode active material layer non-formation part 52a and the negative electrode active material layer non-formation part 62a are joined with the positive electrode collector plate 42a and the negative electrode collector plate 44a, respectively.

As the positive electrode collector 52, a known positive electrode collector for use in a lithium ion secondary battery may be used. Examples thereof may include a sheet or foil made of a metal having good electric conductivity (e.g., aluminum, nickel, titanium, or stainless steel). As the positive electrode collector 52, aluminum foil is desirable.

The dimensions of the positive electrode collector 52 have no particular restriction, and may be appropriately determined according to the battery design. When aluminum foil is used as the positive electrode collector 52, the thickness thereof has no particular restriction, and is, for example, 5 μm or more and 35 μm or less, and desirably 7 μm or more and 20 μm or less.

The positive electrode active material layer 54 includes a positive electrode active material. In the present embodiment, for the positive electrode active material, particles of lithium manganese oxide having a spinel type crystal structure are used. By the use of lithium manganese oxide having this crystal structure, it is possible to impart high thermal stability to the lithium ion secondary battery 100. Further, it is possible to reduce the cost of the lithium ion secondary battery 100. The lithium manganese oxide for use in the present embodiment may have a lithium excessive composition. Further, lithium manganese oxide may include other metal elements within the range not to remarkably impair the effects of the present disclosure.

The lithium manganese oxide for use in the present embodiment has, specifically, for example, a composition expressed as a general formula (I): $Li_{1+x}Mn_{2-x-y}Me_yO_{4-\delta}$. In the general formula (I), Me is at least one metal element selected from the group consisting of Ni, Co, Mg, Fe, Al, Cr, Ga, and Ti, and desirably at least one metal element selected from the group consisting of Mg and Al. x satisfies $0 \le x \le 0.20$, desirably satisfies $0 \le x \le 0.15$, and more desirably satisfies $0 \le x \le 0.10$. y satisfies $0 \le y \le 0.20$, desirably satisfies $0 \le y \le 0.10$, more desirably satisfies $0 \le y \le 0.05$, and is most desirably y=0. $\delta$ is an oxygen deficient value for obtaining the electroneutrality, and $\delta$ satisfies, for example, $0 \le \delta \le 0.20$, desirably satisfies $0 \le \delta \le 0.05$, and is more desirably 0.

As lithium manganese oxide, those within the range of the formula (I) may be used singly alone, or those within the range of the formula (I) may be used in combination of two or more thereof. The lithium manganese oxide particularly desirably has a composition expressed as the general formula (II): $Li_{1+x}Mn_{2-x}O_4$ (where x satisfies $0 \le x \le 0.15$).

In the present embodiment, at least a part of the lithium manganese oxide particles has a cracked part. The cracking is typically caused by the pressing treatment for increasing the density of the positive electrode active material layer 54. However, the cause for cracking has no particular restriction.

In the present embodiment, the lithium manganese oxide particles have a coating film on the particle surface including the surface of the cracked part. In other words, the lithium manganese oxide particle has a coating on the outer surface (or the outer circumferential surface) and the surface of the cracked part. The coating film contains a P component (P-containing component) and an F component (F-containing component). The P component includes a $LiMnPO_4$ component.

In the related art, in order to suppress the dissolution of Mn from a lithium manganese oxide particle, a coating film including phosphorus is provided beforehand. However, when a positive electrode active material layer including a lithium manganese oxide particle having a coating film including phosphorus is subjected to a press treatment, cracking may be caused in the lithium manganese oxide particle. The surface formed by the cracked part has no coating film, and hence dissolution of Mn is caused from the surface of the cracked part. As a result, the capacity of the lithium ion secondary battery is undesirably deteriorated, which is a problem.

In contrast, the lithium ion secondary battery in accordance with the present embodiment is typically obtained by a manufacturing method described later. Namely, the positive electrode active material layer 54 is allowed to include lithium phosphate as a coating film forming component, and then, initial charging is performed at a specific voltage (i.e., 4.7 V or more). This specific voltage is the voltage much higher than the operating voltage of the lithium ion secondary battery 100 (i.e., about 4.2 V). As a result of performing initial charging at such an extremely high voltage, the coating film containing the P component including a $LiMnPO_4$ component, and the F component is formed on the surface of the lithium manganese oxide particle including the cracked part. The mechanism of the coating film formation is presumed as follows. At this voltage, oxidative decomposition of the electrolyte salt is promoted, resulting in an increase in HF amount. The formed HF allows lithium phosphate to be dissolved in the nonaqueous electrolyte 80. Further, a part of the dissolved lithium phosphate is decomposed electrochemically by a high voltage, so that the surface of the lithium manganese oxide particle reacts with a part of the dissolved product or the decomposed product of lithium phosphate to form a coating film including a $LiMnPO_4$ component. Further, the decomposed product of the nonaqueous electrolyte (mainly an F component), or the like is incorporated into the coating film.

Therefore, in the present embodiment, the lithium manganese oxide particles have a coating film on the particle surface including the surface of the cracked part, and the coating film contains a P component including a $LiMnPO_4$ component and an F component. The coating film can suppress the dissolution of Mn from the cracked part of the lithium manganese oxide particle. As a result, it is possible to suppress the capacity deterioration when the lithium ion secondary battery 100 is repeatedly charged and discharged.

The F component is typically a component derived from the decomposed product of the nonaqueous electrolyte 80 (particularly, an electrolyte salt). Further, lithium phosphate and the decomposed product thereof are incorporated into the coating film. Accordingly, the P component can further include other P component than the $LiMnPO_4$ component (particularly, lithium phosphate and the component derived from the decomposed product thereof).

As the coating film formation by lithium phosphate proceeds, the ratio P/F of the P concentration expressed in terms of atom % relative to the F concentration expressed in terms of atom % in the coating film increases. Thus, the ratio P/F is desirably 0.030 or more. In this case, the coating film formation by lithium phosphate effectively proceeds, so that the capacity deterioration suppressing effect is particularly enhanced.

The coating film containing the P component and the F component can be confirmed by analysis by, for example, Energy dispersive X-ray spectroscopy (TEM-EDX) using a transmission electron microscope (TEM).

The coating film including the $LiMnPO_4$ component can be confirmed, for example, in the following manner. $LiMnPO_4$ has an olivine type crystal structure. Thus, using a TEM, a lattice image of the high angle annular dark-field image (HAAD image) is acquired, and the crystal structure is analyzed, thereby confirming that the crystal structure is an olivine type crystal structure. Further, the coating film is analyzed by Electron Energy Loss Spectroscopy using a TEM (TEM-EELS), thereby confirming the presence of Li, the presence of bivalent Mn, and the presence of P.

It should be noted that the ratio P/F of the P concentration (atom %) relative to the F concentration (atom %) can be determined, for example, in the following manner. The coating film is analyzed by TEM-EDX. At this step, the ratio P/F is determined for 10 or more sites on the outer surface of the lithium manganese oxide particle, and for 10 or more sites on the surface of the cracked part of the lithium manganese oxide particle. The average value thereof is referred to as the ratio P/F of the coating film of the lithium manganese oxide particle.

The average particle diameter (median diameter D50) of the lithium manganese oxide particle has no particular restriction, and is, for example, 0.05 μm or more and 25 μm or less, desirably 0.5 μm or more and 23 μm or less, and more desirably 3 μm or more and 22 μm or less. It should be noted that in the present specification, the average particle diameter (median diameter D50) denotes the particle diameter at which the cumulative frequency from the smaller particle diameter side is 50% in the particle size distribution measured by the laser diffraction scattering method unless otherwise specified.

The positive electrode active material layer 54 may include other positive electrode active materials than the lithium manganese oxide particle within the range not to remarkably impair the effects of the present disclosure. The content of the positive electrode active material has no particular restriction, and is desirably 70 mass % or more, more desirably 80 mass % or more, and further desirably 85 mass % or more in the positive electrode active material layer 54 (i.e., based on the total mass of the positive electrode active material layer).

The positive electrode active material layer 54 can include other components than the positive electrode active material. Examples thereof may include lithium phosphate, a conductive material, and a binder.

Lithium phosphate ($Li_3PO_4$) is the component for use in formation of the coating film as described later, and is consumed by initial charging. In this case, lithium phosphate may be fully consumed (accordingly, the content of lithium phosphate is 0 mass %). On the other hand, lithium phosphate may remain. When the positive electrode active material layer 54 includes lithium phosphate, the content of lithium phosphate is desirably less than 10 mass %, more desirably less than 5 mass %, and further desirably less than 3 mass % based on the amount of the positive electrode active material.

As the conductive materials, for example, carbon black such as acetylene black (AB), and other carbon materials (e.g., graphite) can be desirably used. The content of the conductive material in the positive electrode active material layer 54 has no particular restriction, and is, for example, 0.1 mass % or more and 20 mass % or less, desirably 1 mass % or more and 15 mass % or less, and more desirably 2 mass % or more and 10 mass % or less.

As the binder, for example, polyvinylidene fluoride (PVDF) can be used. The content of the binder in the positive electrode active material layer 54 has no particular restriction, and is, for example, 0.5 mass % or more and 15 mass % or less, desirably 1 mass % or more and 10 mass % or less, and more desirably 1.5 mass % or more and 8 mass % or less.

The density of the positive electrode active material layer 54 has no particular restriction. The density of the positive electrode active material layer 54 may be 2.0 $g/cm^3$ or more, and may be 2.3 $g/cm^3$ or more. When the density of the positive electrode active material layer 54 is set at 2.6 $g/cm^3$ or more, a large number of cracks tend to be formed in the lithium manganese oxide particles by the press treatment. For this reason, the capacity deterioration tends to increase. Therefore, since the capacity deterioration suppressing effect by the coating film is particularly enhanced, the density of the positive electrode active material layer 54 is desirably 2.6 $g/cm^3$ or more. On the other hand, the density of the positive electrode active material layer 54 may be 3.3 $g/cm^3$ or less, and may be 3.0 $g/cm^3$ or less. It should be noted that in the present specification, the density of the positive electrode active material layer 54 denotes the apparent density of the positive electrode active material layer 54.

The thickness of the positive electrode active material layer 54 has no particular restriction, and is, for example, 10 μm or more and 300 μm or less, and desirably 20 μm or more and 200 μm or less.

As the negative electrode collector 62, a known negative electrode collector for use in a lithium ion secondary battery may be used. Examples thereof may include a sheet or foil made of a metal having good electric conductivity (e.g., copper, nickel, titanium, or stainless steel). As the negative electrode collector 62, copper foil is desirable.

The dimensions of the negative electrode collector 62 have no particular restriction, and may be appropriately determined according to the battery design. When copper foil is used for the negative electrode collector 62, the thickness has no particular restriction, and is, for example, 5 μm or more and 35 μm or less, and desirably 7 μm or more and 20 μm or less.

The negative electrode active material layer 64 includes a negative electrode active material. As the negative electrode active material, for example, a carbon material such as graphite, hard carbon, or soft carbon can be used. Graphite may be natural graphite, may be artificial graphite, or may be amorphous carbon-coated graphite in a form in which graphite is coated with an amorphous carbon material.

The average particle diameter (median diameter D50) of the negative electrode active material has no particular restriction, and is, for example, 0.1 μm or more and 50 μm or less, desirably 1 μm or more and 25 μm or less, and more desirably 5 μm or more and 20 μm or less.

The content of the negative electrode active material in the negative electrode active material layer 64 has no particular restriction, and is desirably 90 mass % or more, and more desirably 95 mass % or more.

The negative electrode active material layer 64 can include other components than the negative electrode active material, such as a binder and a thickener.

As the binders, for example, styrene butadiene rubber (SBR) and a modified product thereof, acrylonitrile butadiene rubber and a modified product thereof, acrylic rubber and a modified product thereof, and fluorine rubber can be used. Out of these, SBR is desirable. The content of the binder in the negative electrode active material layer 64 has no particular restriction, and is desirably 0.1 mass % or more and 8 mass % or less, and more desirably 0.2 mass % or more and 3 mass % or less.

As the thickeners, for example, cellulose type polymers such as carboxymethyl cellulose (CMC), methyl cellulose (MC), cellulose acetate phthalate (CAP), and hydroxypropyl methyl cellulose (HPMC); and polyvinyl alcohol (PVA) can be used. Out of these, CMC is desirable. The content of the thickener in the negative electrode active material layer 64 has no particular restriction, and is desirably 0.3 mass % or more and 3 mass % or less, and more desirably 0.4 mass % or more and 2 mass % or less.

The thickness of the negative electrode active material layer 64 has no particular restriction, and is, for example, 10 μm or more and 300 μm or less, and desirably 20 μm or more and 200 μm or less.

Examples of the separator 70 may include a porous sheet (film) including a resin such as polyethylene (PE), polypropylene (PP), polyester, cellulose, or polyamide. Such a porous sheet may be of a monolayered structure, or may be of a lamination structure of two or more layers (e.g., a three-layered structure in which PP layers are stacked on the opposite surfaces of a PE layer). A heat resistant layer (HRL) may be provided on the surface of the separator 70.

The thickness of the separator 70 has no particular restriction, and is, for example, 5 μm or more and 50 μm or less, and desirably 10 μm or more and 30 μm or less.

The nonaqueous electrolyte 80 typically includes a nonaqueous solvent and an electrolyte salt (i.e., a support salt).

As the nonaqueous solvents, organic solvents such as various carbonates, ethers, esters, nitriles, sulfones, and lactones for use in the electrolyte of a general lithium ion secondary battery can be used without particular restriction. Out of these, carbonates are desirable. Specific examples thereof may include ethylene carbonate (EC), propylene carbonate (PC), diethyl carbonate (DEC), dimethyl carbonate (DMC), ethyl methyl carbonate (EMC), monofluoroethylene carbonate (MFEC), difluoroethylene carbonate (DFEC), monofluoromethyl difluoromethyl carbonate (F-DMC), and trifluorodimethyl carbonate (TFDMC). Such nonaqueous solvents can be used singly alone, or in appropriate combination of two or more thereof.

As the electrolyte salts, as with a general lithium ion secondary battery, a fluorine-containing lithium salt such as $LiPF_6$, $LiBF_4$, and lithium bis(fluorosulfonyl)imide (LiFSI) can be used. The fluorine-containing lithium salt generates hydrofluoric acid HF necessary for coating film formation, and serves as the F source for the coating film. $LiPF_6$ is desirable as the electrolyte salt because of the ease of formation of the coating film including a proper amount of F component. The concentration of the electrolyte salt has no particular restriction, and is desirably 0.8 mol/L or more, and more desirably 1.0 mol/L or more because HF necessary for coating film formation tends to be generated in a sufficient amount. On the other hand, from the viewpoint of suppressing the increase in battery resistance due to an increase in viscosity of the nonaqueous electrolyte 80, the concentration of the electrolyte salt is desirably 1.8 mol/L or less, and more desirably 1.5 mol/L or less.

It should be noted that the nonaqueous electrolyte 80 may include other components than the foregoing components, for example, various additives including a film forming agent such as an oxalato complex; a gas generator such as biphenyl (BP), or cyclohexyl benzene (CHB); a thickener; and the like, unless the effects of the present disclosure are remarkably impaired.

Then, a description will be given to a method for manufacturing a nonaqueous electrolyte secondary battery in accordance with present embodiment. The method for manufacturing a nonaqueous electrolyte secondary battery in accordance with the present embodiment includes: a step of preparing a positive electrode sheet having a positive electrode active material layer including lithium manganese oxide particles as a positive electrode active material, and lithium phosphate particles (which will be hereinafter referred to as a "positive electrode preparation step"), a step of subjecting the positive electrode sheet to a press treatment (which will be hereinafter referred to as a "press treatment step"), a step of preparing a battery assembly including a positive electrode sheet, a negative electrode sheet, and a nonaqueous electrolyte using the positive electrode sheet subjected to the press treatment (which will be hereinafter referred to as a "battery assembly preparation step"), and a step of subjecting the battery assembly to an initial charging treatment to form a coating film (which will be hereinafter referred to as a "coating film forming step"). In the press treatment step, cracks are formed in the lithium manganese oxide particles. In the coating film forming step, a coating film containing a P component including a $LiMnPO_4$ component and an F component is formed on the particle surface including the surface of the cracked part of the lithium manganese oxide particles.

The method for manufacturing a nonaqueous electrolyte secondary battery in accordance with the present embodiment will be described in details by taking the case of manufacturing the lithium ion secondary battery 100 as an example below.

In the positive electrode preparation step, a positive electrode sheet 50 having a positive electrode active material layer 54 including lithium manganese oxide particles as a positive electrode active material, and lithium phosphate particles is prepared. Specifically, for example, first, a paste for forming a positive electrode active material layer, including lithium manganese oxide particles as positive electrode active materials, lithium phosphate particles, a solvent (disperse medium), and optional components (e.g., a conductive material and a binder) is prepared. It should be noted that in the present specification, the term "paste" represents a mixture in which a part or the whole of the solid content is dispersed in a solvent, and includes a so-called "slurry", "ink", and the like.

The amount of the lithium phosphate particles to be mixed has no particular restriction. From the viewpoint of forming a sufficient amount of coating film, the amount of the lithium phosphate particles to be mixed is desirably 0.2 mass % or more, and more desirably 0.3 mass % or more based on the amount of the lithium manganese oxide particles. On the other hand, when the amount of the lithium phosphate particles is too large, the increase in resistance and the decrease in energy density of the positive electrode active material layer 54 can be caused. For this reason, the amount of the lithium phosphate particles to be mixed is desirably 10 mass % or less, more desirably 5 mass % or less, and further desirably 3 mass % or less based on the amount of the lithium manganese oxide particles.

The particle diameter of lithium phosphate has no particular restriction. The smaller the particle diameter of lithium phosphate is, the larger the specific surface area of lithium phosphate is, and the more lithium phosphate becomes likely to be consumed for coating film formation. Namely, a smaller particle diameter of the lithium phosphate particles is more advantageous for coating film formation. Accordingly, the average particle diameter (median diameter D50) of lithium phosphate is desirably 10 μm or less, more desirably 5 μm or less, and further desirably 3 μm or less. On the other hand, the average particle diameter of lithium phosphate may be 0.05 μm or more, and may be 0.1 μm or more.

The amount of the lithium manganese oxide particles, and optional components to be mixed may be the same as the foregoing content in the positive electrode active material layer 54.

As the solvent, for example, N-methyl pyrrolidone (NMP) can be used. The solid content concentration of the paste for forming a positive electrode active material layer is, for example, 45 mass % or more, and desirably 50 mass % or more and 80 mass % or less from the viewpoint of the drying efficiency. Therefore, the solvent is used in an amount such that the paste for forming a positive electrode active material layer has such a solid content concentration.

The lithium manganese oxide particles, the lithium phosphate particles, the solvent, and optional components are mixed using a known mixing device such as a planetary mixer, a homogenizer, a CLEARMIX, a FILMIX, a bead mill, a ball mill, or an extrusion kneader. As a result, a paste for forming a positive electrode active material layer can be prepared.

Then, the paste for forming a positive electrode active material layer is coated on the positive electrode collector 52. The coating can be performed according to a known method. For example, using a coating device such as a slit coater, a die coater, a comma coater, a gravure coater, or a dip coater, the paste for forming a positive electrode active material layer is applied on the positive electrode collector. As a result, the coating can be performed.

By drying the coated paste for forming a positive electrode active material layer, it is possible to form the positive electrode active material layer 54. Namely, the drying can provide the positive electrode sheet 50 including the positive electrode active material layer 54.

The drying can be performed according to a known method. For example, the drying can be performed by removing the solvent from the positive electrode collector coated with the paste for forming a positive electrode active material layer, using a known drying device (e.g., a hot air drying furnace or an infrared ray drying furnace). The drying temperature and the drying time may be appropriately determined according to the amount of the solvent included in the paste for forming a positive electrode active material layer, and has no particular restriction. The drying temperature is, for example, 70° C. or more and 200° C. or less (desirably 110° C. or more and 180° C. or less). The drying time is, for example, 5 minutes or more and 120 minutes or less.

Then, the press treatment step will be described. In the press treatment step, the positive electrode sheet 50 is subjected to a press treatment. In the press treatment step, the positive electrode active material layer 54 of the positive electrode sheet 50 is compressed, and is increased in density. For the press treatment, a known pressing device can be used. Since the press treatment can be performed continuously, a roll pressing device can be desirably used.

In the present embodiment, the press treatment causes cracking in the lithium manganese oxide particle. The conditions for the press treatment have no particular restriction so long as cracking is caused in the lithium manganese oxide particle. The pressing conditions are set so that the density of the positive electrode active material layer 54 becomes desirably 2.0 g/cm$^3$ or more, more desirably 2.3 g/cm$^3$ or more, and further desirably 2.6 g/cm$^3$ or more. Under the conditions under which the density of the positive electrode active material layer 54 becomes 2.6 g/cm$^3$ or more, a large number of cracks are generated in the lithium manganese oxide particles, resulting in a particular enhancement of the capacity deterioration suppressing effect due to coating film formation. The density of the positive electrode active material layer 54 after the press treatment may be 3.3 g/cm$^3$ or less, or 3.0 g/cm$^3$ or less.

Then, the battery assembly preparation step will be described. In the battery assembly preparation step, using the positive electrode sheet 50 subjected to the press treatment, a battery assembly including the positive electrode sheet 50, the negative electrode sheet 60, and the nonaqueous electrolyte 80 is prepared. The battery assembly preparation step can be carried out according to a known method.

Specifically, for example, the negative electrode sheet 60 can be prepared according to a known method. For example, a paste for forming a negative electrode active material layer, including a negative electrode active material, a solvent, and optional components (e.g., a thickener, and a binder) is prepared. The paste is coated on the negative electrode collector 62, and is dried, and, if required, the resultant is subjected to a press treatment. As a result, the negative electrode sheet 60 can be prepared.

The amounts of the negative electrode active material and the optional components to be mixed may be the same as the contents in the negative electrode active material layer 64.

For the solvent for the paste for forming a negative electrode active material layer, water; a mixed solvent of water and a water-soluble solvent (e.g., alcohol having 1 to 4 carbon atoms), or the like can be used, and water is desirable. The solid content concentration of the paste for forming a negative electrode active material layer is, for example, 45 mass % or more, and desirably 50 mass % or more and 80 mass % or less from the viewpoint of the drying efficiency. Therefore, the solvent is used in an amount such that the paste for forming a negative electrode active material layer has such a solid content concentration.

The specific contents of the preparing operation, the coating operation, the drying operation, the press treatment, and the like of the paste for forming a negative electrode active material layer are the same as those of a known method, and are specifically the same as with the case where the positive electrode sheet 50 is prepared.

A battery assembly can be prepared in the following manner. For example, an electrode body 20 is prepared using the positive electrode sheet 50, the negative electrode sheet 60, and the separator 70. The electrode body 20 is accommodated with the nonaqueous electrolyte 80 in the battery case 30, which is then sealed.

Specifically, for example, when the electrode body 20 is a wound electrode body as with the shown example, as shown in FIG. 2, the positive electrode sheet 50 and the negative electrode sheet 60 are stacked one on another together with two separators 70, thereby preparing a laminated body. The laminated body is wound in the longitudinal direction, thereby preparing a wound body. Then, the wound body is flattened by a press treatment, or the like, thereby preparing an electrode body 20. When the electrode body 20 is a stacked-type electrode body, a plurality of positive electrode sheets 50 and a plurality of negative electrode sheets 60 are stacked alternately with the separators 70 interposed therebetween, thereby preparing the electrode body 20.

As the battery case 30, for example, a battery case including a case main body having an opening, and a lid body for closing the opening is prepared. The lid body is provided with an injection port (not shown) for injecting the nonaqueous electrolyte 80.

A positive electrode terminal 42 and a positive electrode collector plate 42a as well as a negative electrode terminal 44 and a negative electrode collector plate 44a are attached to the lid body of the battery case 30. The positive electrode collector plate 42a and the negative electrode collector plate 44a are welded to the positive electrode collector 52 and the negative electrode collector 62 exposed at the ends of the electrode body 20 (i.e., the positive electrode active material layer non-formation part 52a and the negative electrode active material layer non-formation part 62a), respectively. Then, the electrode body 20 is accommodated from the opening of the main body of the battery case 30 into the inside thereof, and the main body and the lid body of the battery case 30 are welded.

Subsequently, the nonaqueous electrolyte 80 is injected from the injection port, and then, the injection port is sealed. As a result of this, a battery assembly can be obtained.

Subsequently, the coating film forming step will be described. In the coating film forming step, the battery assembly is subjected to an initial charging treatment, thereby forming a coating film containing a P component including a $LiMnPO_4$ component and an F component on the particle surface including the surface of the cracked part of the lithium manganese oxide particle (i.e., the outer surface (or the outer circumferential surface) and the surface of the cracked part).

The initial charging treatment can be performed using a known charger, or the like. The charging conditions has no particular restriction so long as the coating film is formed on the particle surface including the surface of the cracked part of the lithium manganese oxide particle.

As the initial charging method most effective for forming a coating film containing a P component including a $LiMnPO_4$ component and an F component, mention may be made of performing the initial charging treatment up to a voltage of 4.7 V or more. Such a high voltage can readily generate a $LiMnPO_4$ component on the surface of the lithium manganese oxide particle. Accordingly, it is possible to form a coating film containing a P component including a $LiMnPO_4$ component and an F component with ease. The initial charging treatment is desirably performed up to a voltage of 4.8 V or more because the capacity deterioration suppressing effect is more enhanced.

As one example of the initial charging treatment, first, by constant current charging, for example, charging is performed up to a voltage of 4.7 V or more at a current value of 0.05 C or more and 2 C or less (desirably 0.05 C or more and 1 C or less). The upper limit of the voltage at this step has no particular restriction. The upper limit is, for example, 5.1 V, and is desirably 5.0 V.

When charging is performed up to a voltage of 4.7 V or more, the coating film can be formed. However, in order to increase the coating film amount, constant voltage charging may be performed after constant current charging. The time of constant voltage charging has no particular restriction, and is, for example, 1 hour or more and 10 hours or less, and desirably 3 hours or more and 7 hours or less.

By carrying out the steps up to this point, it is possible to obtain a lithium ion secondary battery 100.

The lithium ion secondary battery 100 described up to this point is suppressed in capacity deterioration when charging and discharging are repeated irrespective of the formation of cracks in the lithium manganese oxide particle of a spinel type crystal structure. Accordingly, the lithium ion secondary battery 100 is excellent in cycle characteristic. Further, it is possible to increase the density of the positive electrode active material layer due to such a press treatment as to cause cracking in the lithium manganese oxide particle. For this reason, it is possible to achieve a very high energy density of the lithium ion secondary battery 100. Therefore, the lithium ion secondary battery 100 can have both a longer life and a high energy density.

The lithium ion secondary battery 100 is usable for various uses. As desirable uses, mention may be made of driving power supply to be mounted on a vehicle such as a battery electric vehicle (BEV), a hybrid electric vehicle (HEV), or a plug-in hybrid electric vehicle (PHEV). Further, the lithium ion secondary battery 100 can be used as a storage battery for a compact electric power storage device and the like. The lithium ion secondary battery 100 can also be typically used in a form of a battery pack which typically consists of a plurality of batteries connected in series and/or in parallel.

It should be noted that as one example, the square lithium ion secondary battery 100 including a wound electrode body 20 in a flat shape has been described. However, the nonaqueous electrolyte secondary battery herein disclosed can also be configured as a lithium ion secondary battery including a stacked-type electrode body (i.e., an electrode body including a plurality of positive electrodes and a plurality of negative electrodes stacked alternately). Further, the nonaqueous electrolyte secondary battery herein disclosed can also be configured as a cylindrical lithium ion secondary battery, a laminate-cased lithium ion secondary battery, a coin type lithium ion secondary battery, or the like. Further, the nonaqueous electrolyte secondary battery herein disclosed can also be configured as a nonaqueous electrolyte secondary battery other than a lithium ion secondary battery according to a known method.

Below, Examples regarding the present disclosure will be described. However, it is not intended that the present disclosure is limited to such Examples.

Preparing of Positive Electrode Active Material $Li_2CO_3$ as a Li source and $Mn_3O_4$ as a Mn source were dry mixed for 1 hour. Mixing was performed so that the molar ratio of Li and Mn became Li:Mn=1.1:1.9 at this step. The mixture was placed in an alumina crucible, and was fired in an electric furnace at 1000° C. for 12 hours, and then, was further fired at 600° C. for 18 hours. In this manner, lithium manganese oxide particles A having a spinel type crystal structure were obtained. It should be noted that the average particle diameter (D50) of the lithium manganese oxide particles A was 13.4 μm.

Preparing of Coated Positive Electrode Active Material

Using $Li_3PO_4$ as a sputtering target, by the barrel sputtering method, $Li_3PO_4$ was sputtered on the surface of the lithium manganese oxide particles A obtained above. At this step, the mass ratio of $Li_3PO_4$ based on the mass of the lithium manganese oxide particles A was set at 0.5 mass %. In this manner, a coated lithium manganese oxide particles B having a coating film of $Li_3PO_4$ were obtained.

Manufacturing of Evaluating Lithium Ion Secondary Battery of Each Example and Each Comparative Example Examples A1 to A3

Lithium manganese oxide particles A (LMO-A), carbon black (CB) as a conductive material, and polyvinylidene fluoride (PVDF) as a binder were mixed at mass ratios of LMO-A:CB:PVDF=94:4:2 in N-methyl-2-pyrrolidone (NMP). At this step, $Li_3PO_4$ was further mixed in an amount of 0.5 mass % based on the amount of the lithium manganese oxide particles, thereby preparing a paste for forming a positive electrode active material layer. It should be noted that the average particle diameter (median diameter D50) of $Li_3PO_4$ used was 2.1 μm.

The paste for forming a positive electrode active material layer was coated on aluminum foil, and dried, and then a roll press treatment (i.e., densification treatment) was performed, thereby preparing a positive electrode sheet. The roll press treatment was performed so that the density of the positive electrode active material layer became 2.6 g/cm³. The press treatment caused cracking in the lithium manganese oxide particles A. The positive electrode sheet was cut into dimensions of 120 mm×100 mm.

Further, spheroidal graphite (C) as a negative electrode active material, styrene butadiene rubber (SBR) as a binder, and carboxymethyl cellulose (CMC) as a thickener were mixed at mass ratios of C:SBR:CMC=98:1:1 in ion exchanged water, thereby preparing a paste for forming a negative electrode active material layer. The paste for forming a negative electrode active material layer was coated on copper foil, and was dried, and then, was subjected to a densification treatment by roll pressing, thereby preparing a negative electrode sheet. The negative electrode sheet was cut into dimensions of 122 mm×102 mm.

As a separator sheet, a porous polyolefine sheet was prepared. A separator was sandwiched between the positive electrode sheet and the negative electrode sheet, thereby preparing a stacked-type electrode body. Electrode terminals were attached to the stacked-type electrode body. This was accommodated together with a nonaqueous electrolyte in a laminate case. For the nonaqueous electrolyte, the one obtained by dissolving $LiPF_6$ in a mixed solvent including ethylene carbonate (EC), dimethyl carbonate (DMC), and ethyl methyl carbonate (EMC) at volume ratios of 3:3:4 to a concentration of 1.1 mol/L was used. Then, the laminate case was sealed, thereby preparing a battery assembly.

The battery assembly was subjected to constant current charging up to 4.7 V (A1), 4.8 V (A2), or 4.9 V (A3) at a current value of 0.1 C as the initial charging treatment. Then, constant voltage charging was performed for 3 hours, thereby performing initial charging. Thereafter, constant current discharging was performed to 3.0 V at a current value of 0.1 C, resulting in each evaluating lithium ion secondary battery of Examples A1 to A3.

Comparative Examples A1 to A8

Lithium manganese oxide particles A (LMO-A), carbon black (CB) as a conductive material, and polyvinylidene fluoride (PVDF) as a binder were mixed at mass ratio of LMO-A:CB:PVDF=94:4:2 in N-methyl-2-pyrrolidone (NMP), thereby preparing a paste for forming a positive electrode active material layer. A positive electrode sheet was prepared, and further, a battery assembly was prepared in the same manner as in Example A1, except for using this paste for forming a positive electrode active material layer.

The battery assembly was subjected to constant current charging up to 4.2 V (A1), 4.3 V (A2), 4.4 V (A3), 4.5 V (A4), 4.6 V (A5), 4.7 V (A6), 4.8 V (A7), or 4.9 V (A8) at a current value of 0.1 C. Then, constant voltage charging was performed for 3 hours, thereby performing initial charging. Constant current discharging was performed to 3.0 V at a current value of 0.1 C, resulting in each evaluating lithium ion secondary battery of Comparative Examples A1 to A8.

Comparative Examples A9 to A16

Coated lithium manganese oxide particles B (LMO-B), carbon black (CB) as a conductive material, and polyvinylidene fluoride (PVDF) as a binder were mixed at mass ratios of LMO-B:CB:PVDF=94:4:2 in N-methyl-2-pyrrolidone (NMP), thereby preparing a paste for forming a positive electrode active material layer. A positive electrode sheet was prepared, and further a battery assembly was prepared in the same manner as in Example A1, except for using this paste for forming a positive electrode active material layer.

The battery assembly was subjected to constant current charging up to 4.2 V (A9), 4.3 V (A10), 4.4 V (A11), 4.5 V (A12), 4.6 V (A13), 4.7 V (A14), 4.8 V (A15), or 4.9 V (A16) at a current value of 0.1 C. Then, constant voltage charging was performed for 3 hours, thereby performing initial charging. Constant current discharging was performed to 3.0 V at a current value of 0.1 C, resulting in each evaluating lithium ion secondary battery of Comparative Examples A9 to A16.

Comparative Examples A17 to A21

A battery assembly was prepared in the same manner as in Example A1. The battery assembly was subjected to constant current charging up to 4.2 V (A17), 4.3 V (A18), 4.4 V (A19), 4.5 V (A20), or 4.6 V (A21) at a current value of 0.1 C. Then, constant voltage charging was performed for 3 hours, thereby performing initial charging. Constant current discharging was performed to 3.0 V at a current value of 0.1 C, resulting in each evaluating lithium ion secondary battery of Comparative Examples A17 to A21.

Cycle Characteristic Evaluation

Each of the evaluating lithium ion secondary batteries manufactured as described above was placed under 25° C. environment. Each evaluating lithium ion secondary battery was subjected to constant current charging up to 4.2 V at a current value of 0.1 C. Then, constant voltage charging was performed until the current value became 1/50 C, resulting in a fully charged state. Subsequently, each evaluating lithium ion secondary battery was subjected to constant current discharging to 3.0 V at a current value of 0.1 C. The discharge capacity at this step was measured, thereby determining the initial capacity.

Then, each evaluating lithium ion secondary battery was placed under 60° C. environment. Thus, charging and discharging including constant current charging up to 4.2 V at 0.5 C and constant current discharging to 3.0 V at 0.5 C as one cycle was repeated 100 cycles. The discharge capacity after 100 cycles was determined in the same manner as with the initial capacity. As the index of the cycle characteristic (capacity deterioration resistance), the capacity retention rate (%) was determined by (discharge capacity after 100 cycles of charging and discharging/initial capacity)×100. The results are shown in Table 1.

Analysis of Coating Film

Each evaluating lithium ion secondary battery of Examples and some of Comparative Examples was disassembled, and the positive electrode active material layer was taken out. Using a focused ion-beam processing observation device "FB2100" manufactured by Hitachi High-Tech Inc., the positive electrode active material layer was cut by focused ion-beam. The cross section was observed at an acceleration voltage of 200 kV using a transmission electron microscope "JFM-ARM300F" manufactured by JEOL Ltd. Respective 10 parts of the outer surface of the lithium manganese oxide particle present in the cross section, and the cracked part of the particle were selected, and analyzed by the TEM-EDX method using an energy dispersion type X-ray analyzer "JED-2300T" manufactured by JEOL Ltd. The analysis was performed at a magnification of 200 to 1000 k. As a result of this, the presence of the P component and the F component was confirmed. Thus, the average value of the ratios of the concentration of P (atom %)/the concentration of F (atom %) was calculated. The results are shown in Table 2.

Further, the lattice image of the particle surface was confirmed at a magnification of 2 M to 10 M, and it was confirmed whether other lattice images than that of $LiMn_2O_4$ were present or not. In Examples, other lattice images than that of $LiMn_2O_4$ were confirmed, and analysis based on the HAADTEM image and analysis by Electron Energy Loss Spectroscopy EELS were further performed. As a result, the presence of the $LiMnPO_4$ component of an olivine type crystal structure was confirmed. The results are shown in Table 2.

TABLE 1

| Initial charging voltage (V) | Capacity retention rate (%) | | | | | |
|---|---|---|---|---|---|---|
| 4.2 | Comprative | 73.8 | Comparative | 78.2 | Comparative | 76.4 |
| 4.3 | Examples | 72.1 | Examples | 78.9 | Examples | 77.7 |
| 4.4 | A1 to A8 | 70.8 | A9 to A16 | 79.7 | A17 to A21 | 78.8 |
| 4.5 | | 69.5 | | 80.6 | | 80 |
| 4.6 | | 67.7 | | 81.5 | | 81.1 |
| 4.7 | | 65.4 | | 76.4 | Examples | 83.6 |
| 4.8 | | 63.8 | | 74.1 | A1 to A3 | 85.3 |
| 4.9 | | 62.3 | | 71.8 | | 87.5 |

TABLE 2

| | Initial charging voltage (V) | P/F concentration ratio | $LiMnPO_4$ component in coating |
|---|---|---|---|
| Comparative Example A20 | 4.5 | 0.011 | None |
| Comparative Example A21 | 4.5 | 0.023 | None |
| Example A1 | 4.7 | 0.030 | Present |
| Example A2 | 4.8 | 0.047 | Present |
| Example A3 | 4.9 | 0.052 | Present |

In Comparative Examples A1 to A8, the lithium manganese oxide particles A1 not having a coating film were used, and $Li_3PO_4$ was not added to the positive electrode active material layer. In Comparative Examples A1 to A8, the following was observed: the higher the voltage of initial charging was, the more the capacity retention rate tended to be reduced.

In Comparative Examples A9 to A16, the lithium manganese oxide particles B1 including a coating film of $Li_3PO_4$ formed beforehand thereon were used, and $Li_3PO_4$ was not added to the positive electrode active material layer. Comparison with Comparative Examples A1 to A8 indicates that the capacity deterioration was improved by the coating film of $Li_3PO_4$. However, when the voltage of initial charging became 4.7 V or more, the capacity deterioration tended to rapidly increase.

In Comparative Examples A17 to A21, the lithium manganese oxide particles A1 not having a coating film were used, and $Li_3PO_4$ was added to the positive electrode active material layer. When the voltage of initial charging fell within the range of 4.2 V to 4.6 V, a capacity deterioration resistance comparable to that in the case using the lithium manganese oxide particles B1 including a coating film of $Li_3PO_4$ formed beforehand thereon was exhibited.

In Examples A1 to A3, the lithium manganese oxide particles A1 not having a coating film were used, and $Li_3PO_4$ was added to the positive electrode active material layer. Irrespective of the voltage of initial charging falling within the range of 4.7 V to 4.9 V, the capacity retention rate became very high.

As indicated by the results of Comparative Examples A1 to A8 and Comparative Examples A9 to A16, generally, the phenomenon is observed in which when the voltage of initial charging is high, capacity deterioration is large. However, the results of Comparative Examples A17 to A21 and Examples A1 to A3 indicate as follows: when the lithium manganese oxide particles A1 not having a coating film were used and $Li_3PO_4$ is added to the positive electrode active material layer, an unusual phenomenon occurs.

In this regard, the analysis results of the coating film shown in Table 2 indicate as follows: when the voltage of initial charging is set at 4.7 V or more, a $LiMnPO_4$ component is newly generated in the coating film. Accordingly, it can be understood that a new coating film containing a P component including a $LiMnPO_4$ component, and an F component allowed a remarkably high capacity deterioration resistance to be exhibited.

The results up to this point indicate as follows: with the nonaqueous electrolyte secondary battery herein disclosed, the capacity deterioration upon repeating charging and discharging is suppressed irrespective of the formation of cracks in the lithium manganese oxide particle having a spinel type crystal structure.

Examples B1 to B6

Respective positive electrode sheets were prepared in the same manner as in Example A1. Each positive electrode sheet was subjected to a roll press treatment so that the densities of the positive electrode active material layers became 2.0 g/cm$^3$ (B1), 2.2 g/cm$^3$ (B2), 2.4 g/cm$^3$ (B3), 2.6 g/cm$^3$ (B4), 2.8 g/cm$^3$ (B5), or 3.0 g/cm$^3$ (B6), respectively. Each positive electrode sheet was cut into dimensions of 120 mm×100 mm.

A battery assembly was prepared using the cut positive electrode sheet in the same manner as in Example A1. The battery assembly was subjected to constant current charging up to 4.7 V at a current value of 0.1 C as the initial charging treatment. Then, constant voltage charging was performed for 3 hours, thereby carrying out initial charging. Subsequently, constant current discharging was performed to 3.0 V at a current value of 0.1 C, resulting in each evaluating lithium ion secondary battery of Examples B1 to B6.

Comparative Examples B1 to B6

Respective positive electrode sheets were prepared in the same manner as in Comparative Example A1. The positive electrode sheets were subjected to a roll press treatment so that the densities of the positive electrode active material layers became 2.0 g/cm$^3$ (B1), 2.2 g/cm$^3$ (B2), 2.4 g/cm$^3$ (B3), 2.6 g/cm$^3$ (B4), 2.8 g/cm$^3$ (B5), or 3.0 g/cm$^3$ (B6), respectively. Each positive electrode sheet was cut into dimensions of 120 mm×100 mm.

A battery assembly was prepared using the cut positive electrode sheet in the same manner as in Example A1. The battery assembly was subjected to constant current charging up to 4.7 V at a current value of 0.1 C as the initial charging treatment. Then, constant voltage charging was performed for 3 hours, thereby performing initial charging. Subsequently, constant current discharging was performed to 3.0 V at a current value of 0.1 C, resulting in each evaluating lithium ion secondary battery of Comparative Examples B1 to B6.

Comparative Examples B7 to B12

Respective positive electrode sheets were prepared in the same manner as in Comparative Example A9. The positive electrode sheets were subjected to a roll press treatment so that the densities of the positive electrode active material layers became 2.0 g/cm³ (B7), 2.2 g/cm³ (B8), 2.4 g/cm³ (B9), 2.6 g/cm³ (B10), 2.8 g/cm³ (B11), or 3.0 g/cm³ (B12), respectively. Each of the positive electrode sheets was cut into dimensions of 120 mm×100 mm.

A battery assembly was prepared using the cut positive electrode sheet in the same manner as in Example A1. The battery assembly was subjected to constant current charging up to 4.7 V at a current value of 0.1 C as the initial charging treatment. Then, constant voltage charging was performed for 3 hours, thereby performing initial charging. Subsequently, constant current discharging was performed to 3.0 V at a current value of 0.1 C, resulting in each evaluating lithium ion secondary battery of Comparative Examples B7 to B12.

Comparative Examples B13 to B18

Each positive electrode sheet was prepared in the same manner as in Example A1. Respective positive electrode sheets were subjected to a roll press treatment so that the densities of the positive electrode active material layers became 2.0 g/cm³ (B13), 2.2 g/cm³ (B14), 2.4 g/cm³ (B15), 2.6 g/cm³ (B16), 2.8 g/cm³ (B17), or 3.0 g/cm³ (B18), respectively. Each of the positive electrode sheets was cut into dimensions of 120 mm×100 mm.

A battery assembly was prepared using the cut positive electrode sheet in the same manner as in Example A1. The battery assembly was subjected to constant current charging up to 4.2 V at a current value of 0.1 C as the initial charging treatment. Then, constant voltage charging was performed for 3 hours, thereby performing initial charging. Subsequently, constant current discharging was performed to 3.0 V at a current value of 0.1 C, resulting in each evaluating lithium ion secondary battery of Comparative Examples B13 to B18.

Cycle Characteristic Evaluation

For each evaluating lithium ion secondary battery manufactured above, the capacity retention rate (%) was determined in the same manner as described above. The results are shown in Table 3 and FIG. 3.

TABLE 3

| | | Capacity retention rate (%) | | | |
|---|---|---|---|---|---|
| | | Comparative Examples B1 to B6 | Comparative Examples B7 to B12 | Comparative Examples B13 to B18 | Examples B1 to B6 |
| Density of positive electrode active material layer (g/cm³) | 2.0 | 80.9 | 87.6 | 82.2 | 88.2 |
| | 2.2 | 78.7 | 84.5 | 81.0 | 87.1 |
| | 2.4 | 77.4 | 82.1 | 79.6 | 85.4 |
| | 2.6 | 73.8 | 78.2 | 76.4 | 83.6 |
| | 2.8 | 71.5 | 76.6 | 73.3 | 83.0 |
| | 3.0 | 69.7 | 73.9 | 71.1 | 82.3 |
| Coating formation | | 4.7 V initial charging | Li₃PO₄ sputtering | Li₃PO₄ addition + 4.2 V initial charging | Li₃PO₄ addition + 4.7 V initial charging |

Figure 3:
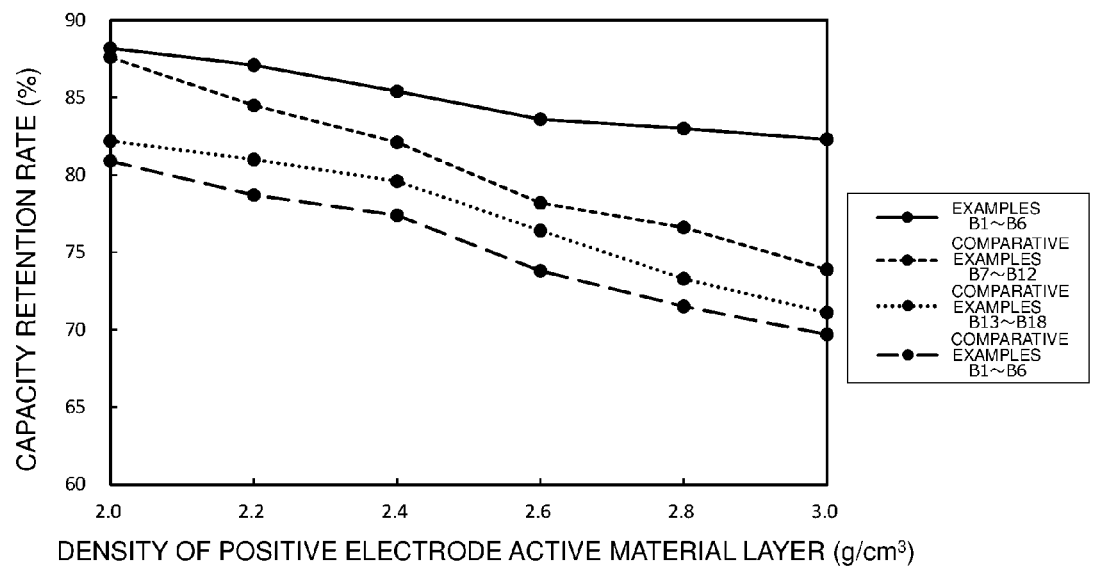
FIG. 3 is a graph showing the relationship between the density of a positive electrode active material layer and the capacity retention rate for Examples B1 to B6, Comparative Examples B1 to B6, Comparative Examples B7 to 12, and Comparative Examples B13 to 18.

As indicated by the results of Table 3 and FIG. 3, in Comparative Examples, when the density of the positive electrode active material layer became 2.6 g/cm³ or more, the degree of the capacity deterioration increased. However, in Examples, even when the density of the positive electrode active material layer became 2.6 g/cm³ or more, the degree of the capacity deterioration was small. This indicates as follows: with the nonaqueous electrolyte secondary battery herein disclosed, when the density of the positive electrode active material layer is 2.6 g/cm³ or more, the capacity deterioration suppressing effect is particularly high.

Up to this point, specific examples of the present disclosure were described in details. However, these are merely illustrative, and should not be construed as limiting the scope of the appended claims. The technology described in the appended claims includes various modifications and changes of the specific examples exemplified up to this point.

What is claimed is:

1. A nonaqueous electrolyte secondary battery, comprising: a positive electrode, a negative electrode, and a nonaqueous electrolyte,
    wherein the positive electrode includes a positive electrode active material layer,
    the positive electrode active material layer includes lithium manganese oxide particles having a spinel type crystal structure as a positive electrode active material,
    at least a part of the lithium manganese oxide particles has a cracked part,
    the lithium manganese oxide particles have a coating film on a particle surface including a surface of the cracked part,
    the coating film contains a P component including a LiMnPO₄ component having a crystal structure, and an F component, and
    the lithium manganese oxide particles have a composition expressed as a general formula of $Li_{1+x}Mn_{2-x}O_4$, where x satisfies 0≤x≤0.15.

2. The nonaqueous electrolyte secondary battery according to claim 1,
    wherein a ratio of P/F of a P concentration expressed in terms of atom % relative to an F concentration expressed in terms of atom % in the coating film is 0.030 or more.

3. The nonaqueous electrolyte secondary battery according to claim 1,
    wherein a density of the positive electrode active material layer is 2.6 g/cm³ or more.

4. The nonaqueous electrolyte secondary battery according to claim 1,
    wherein the positive electrode active material layer includes lithium phosphate.

5. The nonaqueous electrolyte secondary battery according to claim 1, wherein the nonaqueous electrolyte includes $LiPF_6$ as an electrolyte salt.

6. A method for manufacturing a nonaqueous electrolyte secondary battery, comprising the steps of:
preparing a positive electrode sheet including a positive electrode active material layer containing lithium manganese oxide particles as positive electrode active materials, and lithium phosphate particles;
subjecting the prepared positive electrode sheet to a press treatment;
preparing a battery assembly including a positive electrode sheet, a negative electrode sheet, and a nonaqueous electrolyte, using the positive electrode sheet subjected to the press treatment; and
subjecting the battery assembly to an initial charging treatment to form a coating film,
wherein in the step of performing the press treatment, cracks are formed in the lithium manganese oxide particles, and
in the step of forming the coating film, a coating film containing a P component including a $LiMnPO_4$ component, and a F component is formed on a particle surface including a surface of a cracked part of the lithium manganese oxide particles.

7. The manufacturing method according to claim 6,
wherein the initial charging treatment is performed until a voltage becomes 4.7 V or more.

8. The manufacturing method according to claim 6,
wherein the press treatment is performed such that a density of the positive electrode active material layer becomes 2.6 $g/cm^3$ or more.

9. The nonaqueous electrolyte secondary battery according to claim 1, wherein the coating film directly covers the particle surface.

\* \* \* \* \*